United States Patent [19]

Kabay et al.

[11] Patent Number: 4,857,228

[45] Date of Patent: Aug. 15, 1989

[54] PHOSPHORS AND METHODS OF PREPARING THE SAME

[75] Inventors: Gabriella H. Kabay; Ernest Kabay, both of Sovizzo, Italy

[73] Assignee: Sunstone Inc., Dayton, N.J.

[21] Appl. No.: 275,689

[22] Filed: Nov. 23, 1988

Related U.S. Application Data

[63] Continuation of Ser. No. 922,864, Oct. 24, 1986, abandoned, which is a continuation-in-part of Ser. No. 842,731, Mar. 20, 1986, abandoned, which is a continuation of Ser. No. 603,304, Apr. 24, 1984, abandoned.

[51] Int. Cl.$^4$ .............................................. C09K 11/88
[52] U.S. Cl. ........................ 252/301.4 S; 252/301.4 H
[58] Field of Search ................... 252/301.4 S, 301.4 H

[56] References Cited

U.S. PATENT DOCUMENTS

| | | | |
|---|---|---|---|
| 2,402,759 | 6/1946 | Leverenz | 252/301.4 S |
| 2,522,074 | 9/1950 | Urbach | 252/301.4 S |
| 2,527,365 | 10/1950 | Leverenz | 252/301.4 S |
| 4,442,377 | 4/1984 | Higton et al. | 252/301.4 S |
| 4,755,324 | 7/1988 | Lindmayer | 252/301.4 S |

OTHER PUBLICATIONS

Primak et al., "J. Amer. chem. Soc.", vol. 69, 1947, pp. 1283–1287.

*Primary Examiner*—Jack Cooper
*Attorney, Agent, or Firm*—Morgan & Finnegan

[57] ABSTRACT

Phosphors based on a crystalline matrix of an alkaline earth and a chalcogen together with an activator system are prepared by a process which preferably includes exposure to both S and Se vapors. The phosphors have enhanced light output. IR-stimulable phosphors have stimulation quantum efficiencies above 5%, and preferably include Eu:Sm or Eu:Bi activator systems. Eu:Cu activators provide phosphorescent phosphors.

22 Claims, 4 Drawing Sheets

PHOSPHORS AND METHODS OF PREPARING THE SAME

BACKGROUND OF THE INVENTION

The present invention relates to phosphors and methods of preparing phosphors.

The present application is a continuation of application Ser. No. 922,864, filed on Oct. 24, 1986, which in turn is a continuation-in-part of U.S. patent applicaton Ser. No. 842,731, filed Mar. 20, 1986, which in turn is a continuation of U.S. patent application Ser. No. 603,304, filed Apr. 24, 1984 all now abandoned. The disclosure of said prior applications is incorporated herein by reference. However, to the extent that any text in the present application expressly modifies the disclosure of said prior applications, the present application should be understood as taking precedence over the disclosure of said prior applications.

Phosphors are materials which absorb energy and release the absorbed energy in the form of electromagnetic radiation, most typically as visible light. Where the phosphor absorbs energy from electromagnetic radiation, impinging on the phosphor this radiation may be referred to as "exciting" radiation. Where the absorbed energy is released immediately, the phenomenon is known as "fluorescence." For example, a material which exhibits fluorescence may emit visible light while excited by ultraviolet light impinging upon the material. Where the absorbed energy is stored for an appreciable period of time but released spontaneously, the phenomenon is referred to as "phosphorescence." For example, a phosphorescent material may glow with visible light for a considerable period after it is exposed to ultraviolet light, x-rays or the like. The brightness of the glow will gradually decrease as the stored energy is released. Where the energy of the exciting electromagnetic radiation is stored within the phosphor and released in response to additional electromagnetic radiation, referred to as "stimulating" radiation, the phenomenon is referred to as "stimulated emission." For example, a phosphor exhibiting the behavior referred to as stimulated emission may be exposed to ultraviolet radiation, and exhibit no appreciable glow after the ultraviolet exposure. However, when this phosphor is treated with infrared stimulating radiation, it may emit substantial quantities of visible light. The term "luminescence" includes all of these phenomena, as well as other phenomena involving absorption of energy within a material and release of that energy as electromagnetic radiation, most typically, but not necessarily, as visible light. The term "phosphor" thus includes all luminescent materials.

Phosphors can be categorized in accordance with their behavior as fluorescent, phosphorescent or stimulable. As used in this disclosure, such categories should be understood as based upon the predominant behavior of the phosphor at about room temperature, i.e, at about 20° C. Thus, a "stimulable" phosphor is one which, at room temperature, stores energy absorbed upon exposure to exciting electromagnetic radiation and releases the predominant portion of the stored energy upon exposure to stimulating electromagnetic radiation. A phosphorescent phosphor at room temperature will store absorbed energy for an appreciable time but will release the predominant portion of the stored energy spontaneously. A fluorescent phosphor will release the prdominant portion of the absorbed energy as emission radiant energy substantially simultaneously with exposure to the exciting radiant energy. Those phosphors which are stimulable, at about room temperature, by stimulating electromagnetic radiation in the infrared regon of the electromagnetic spectrum are referred to herein as "IR-stimulable" phosphors. Typically, but not necessarily, IR-stimulable phosphors also exhibit some fluorescence.

Phosphors can be utilized in a wide variety of scientific and industrial applications. Notably, IR-stimulable phosphors which emit visible light can be used to render visible a pattrn of infrared radiation and hence can be used in optical systems such as detectors for infrared laser beams, night vision apparatus, and the like. The use of stimulable phosphors to emit light of relatively short wavelength, such as visible light, upon stimulation with light of relatively long wavelength is referred to as "upconversion" or "anti-stokes" conversion. Also, the energy storage capabilities of stimulable phosphors can be employed in optical memory devices. Phosphorescent phosphors may be employed to provide a short-term steady glow, as an emergency illumination source or the like.

Although the present invention is not limited by any theory of operation, phenomena involving electromagnetic radiation, including the behavior of phosphors, may be explained in terms of quantum mechanics. A photon is an energetic particle representing a single quantum of electromagnetic radiation. The energy of the photon determines the wavelength of the radiation. Electrons in solids are regarded as being able to occupy only certain predetermined states having different predetermined energy levels. A solid emits electromagnetic radiation when an electron passes from one state to another state of lower energy; the difference in energy is released as a single photon or quantum of radiation.

The term "active site" as used in this disclosure means a feature of a phosphor which can emit one photon in a specified type of luminescence, regardless of the underlying principle of operation. The properties of an active site are generally believed to be determined by the available energy bands for an electron at the active site. Typically, these include a "ground" state and a "metastable" state or "trap" at a higher energy than the ground state. In and active site which contributes to stimulated emission, there is also a "barrier" between the metastable state and the ground state. Thus, it is generally considered that energy absorbed by the phosphor promotes electrons from the ground state to the metastable state, and that the electrons once promoted to the metastable state remain there until they are further promoted by the stimulating radiation, whereupon they acquire sufficient energy to surmount the energy barrier and fall back to the ground state, liberating emission radiant energy. There may also be other states as well involved in the transition from the ground state to the metastable state, or from the metastable state back to the ground state, but in general there is believed to be an energy barrier. In an active site which contributes to phosphorescence, there is likewise believed to be a barrier, ordinarily considered as being of smaller magnitude, so that the electron in the metastable state has an appreciable probability of surmounting the barrier at a given moment while the phosphor is maintained at room temperature.

As will be appreciated, the nature of the active sites in a phosphor substantially determines the nature of the luminescent activity exhibited by the phosphor. In this disclosure, where a phosphor is characterized by a single particular type of luminescent activity, and characterized as having a particular number of active sites, that number should be understood as specifying the number of active sites which participate in the particular luminescent activity. Thus, where a phosphor is characterized as "stimulable," and as having a given number of active sites, it has that number of active sites which participate in stimulated emission. If a phosphor characterized as stimulable also has other active sites which participate in other forms of luminescence such as phosphorescence or fluorescence, but do not participate in stimulated emission, the same would not be counted. Conversely, a phosphor characterized as "phosphorescent" and as having a certain number of active sites has that number of active sites capable of participating in phosphorescence. Where a number of active sites is given without any characterization of activity, that number is the total number of active sites active in all forms of luminscence.

Certain phosphors known heretofore are based upon a crystalline matrix including alkaline earth elements such as strontium, calcium, or combinations thereof, and one or more chalcogens selected from the group consisting of sulfur and selenium, together with one or more "activator" elements present in minor proportions. These phosphors are referred to herein as "activated alkaline earth/chalcogen phosphors." Thus, U.S. Pat. No. 2,522,074 describes, inter alia, an IR-stimulable phosphor having europium and samarium activators dispersed in a matrix of strontium sulfide. This material will absorb and store energy upon exposure to ultraviolet or blue visible exciting radiation and will emit the stored energy as orange visible light upon stimulation by infrared radiation. Generally similar phosphors based on a strontium selenide matrix rather than strontium sulfide have also been developed. As described in U.S. Pat. No. 2,527,365 of H. W. Leverenz, phosphors of this general type may incorporate a mixture of the sulfides and selenides, and are particularly advantageous inasmuch as they emit yellow light upon infrared stimulation. The '365 patent uses the term "sulfoselenides" to describe these phosphors. The yellow light emitted by the sulfoselenide phosphors has wavelengths generally corresponding to the maximum sensitivity of the dark adapted human eye.

A long-sought goal in the phosphor art has been to provide more potent and more efficient phosphors. Thus, it has been a long-standing goal in the phosphor art to increase the quantities of energy which can be absorbed and emitted by a given quantity of the phosphor. With respect to stimulable phosphors, a further long-sought goal in the art has been to increase the "stimulation quantum efficiency," a measure of the relationship between the amount of stimulating radiation absorbed by the phosphor and the amount of electromagnetic radiation emitted by the phosphor in response thereto. The stimulation quantum efficiency relates directly to the energy storage capacity of the phosphor itself, and therefore, relates directly to the number of active sites in the phosphor.

Although these goals have long been sought, the way to achieve them heretofore has not been apparent. The art heretofore has not been able to provide phosphors, and specifically activated alkaline earth/chalcogen phosphors, with the desired number of active sites. Thus, although it is generally believed that the formation of active sites in activated alkaline earth/chalcogen phosphors, and the nature of the active sites so formed relate in some way to the presence of activators in the system, merely increasing the amounts of activators present does not always result in an increase in the number of active sites or in the stimulation quantum efficiency of the phosphor. The activated alkaline earth/chalcogen phosphors available heretofore have incorporated no more than about $10^{17}$ active sites per cm$^3$. These phosphors of the prior art have been infrared stimulable, but have had stimulation quantum efficiencies typically about 1% or less.

SUMMARY OF THE INVENTION

One aspect of the present invention provides activated alkaline earth/chalcogen phosphors which are more potent than the phosphors of the prior art. Phosphors according to this aspect of the present invention preferably comprise a crystalline matrix including sulphur, selenium, and an alkaline earth metal selected from the group consisting of calcium, strontium, and combinations thereof, strontium being particularly preferred. The phosphor also includes one or more activators dispersed in the matrix. The activators and the matrix cooperatively define active sites for emission of electromagnetic radiation. Unlike the activated alkaline-earth/chalcogen phosphors of the prior art, however, phosphors according to this aspect of the present invention include at least about $5 \times 10^{17}$ active sites per cm$^3$, and more preferably at least about $10^{18}$ active sites per cm$^3$. Stated another way, phosphors according to preferred embodiments of the present invention are many times more potent than comparable phosphors of the prior art.

The activators preferably are heavy metals or transition metals. Two different activators typically are present in a phosphor according to preferred forms of the present invention. The nature of the active sites, and hence the behavior of the phosphor itself, will depend upon the particular activators selected. For an IR-stimulable phosphor, the combinations of Eu and Sm and Eu and Bi are preferred. Typically, the activators used in the present invention are employed in substantially similar quantities to the quantities employed in the alkaline earth/chalcogen-based phosphors of the prior art. Thus, each activator preferably is present in the matrix in an amount equal to between about 5 and about 500 parts per million by weight based on the weight of the matrix, and more preferably between about 10 and about 300 parts per million by weight.

IR-stimulable phosphors according to preferred embodiments of this aspect of the present invention have stimulation quantum efficiencies greater than about 5%, ordinarily about 8% or more, and preferably about 10% or more. Stimulation quantum efficiencies of about 20% or more can be achieved in some cases. Moreover, the preferred IR-stimulable phosphors according to this aspect of the present invention have additional desirable properties. The absorption spectrum of a preferred phosphor according to this aspect of the invention—the wavelengths of radiation which can be absorbed and stored for later emission—typically includes both visible light and ultraviolet light, and generally covers wavelengths from about 530 nm to about 220 nm. There is typically an absorption peak or maximum of absorption in the visible range, in the vicinity of 450 nm, most typically with two overlapping broad bands peaking at about 420 nm and 480 nm, and there is typically a further absorption peak in the ultraviolet, most typically at about 335 nm. The stimulation spectra of these phosphors—the wavelengths of infrared radiation which will cause release of stored energy as light—generally include the region from about 800 to about 1200 nm and beyond, with greater sensitivity between about 850 and 1150 nm, typically about 950–1050 nm and with a peak sensitivity at about 970 nm. The stimulated emission spectrum or range of wavelengths of radiation emitted from these preferred IR-stimulable phosphors upon stimulation include visible light between about 500 nm and about 700 nm, with substantial emission between about 550 and about 620 nm, the emission peak or maximum intensity of emitted light falling between about 55 and about 590 nm. As explained below, the emission peak can be adjusted by controlling the composition of the phosphor, but most preferably is at about 570 nm to provide yellow emitted light, in a spectral region where the human eye is particularly sensitive.

The preferred phosphors according to this aspect of the present invention can absorb and store intense light typically in excess of $10^5$ lux, without damage, and can withstand infrared or ultraviolet radiation of about 6.4MW/cm$^2$ without damage. Thus, these phosphors are rugged and well adapted to store energy from intense sources such as powerful lasers and the like. These phosphors, like other IR-stimulable phosphors, are susceptible to "quenching" or loss of stored energy without emission upon exposure to visible light in the orange region of the spectrum (550–650 nm). However, when protected from quenching and stimulating radiation, the preferred phosphors according to this aspect of the present invention retain their stored energy well, typically losing about 20% or less of the stored energy during storage at room temperature for 24 hours. Preferred phosphors according to this aspect of the present invention do not deteriorate appreciably either upon repeated reuse or upon prolonged storage when protected from the atmosphere.

The preferred phosphorescent phosphors according to this aspect of the present have absorption and emission spectra similar to those of the IR-stimulable phosphors referred to above. Thus, the absorption spectrum typically extends from about 220 nm to about 540 nm, with peaks at about 300–350 nm and about 400–450 nm. The emission spectrum typically is between about 500 to about 700 nm, most preferably about 510 to 630 nm, with an emission peak at about 550 to about 600 nm, most preferably at about 560–570 nm. As with the IR-stimulable phosphors, the emission spectrum can be controlled by controlling the composition of the phosphor. Other valuable properties such as stability, ability to withstand intense radiation without damage, and the like are also similar. Moreover, the preferred phosphorescent phosphors according to this aspect of the present invention can emit by phosphorescence more than $5 \times 10^{17}$, typically more than $10^{18}$ photons/cm$^3$.

According to a further aspect of the present invention, it has now been found that Eu and Cu together form an activator system for incorporation into an activated alkaline earth/chalcogen phosphor to provide phosphorescent behavior. This activator system is especially useful in phosphors wherein the base matrix incorporates sulphur or both sulphur and selenium, and particularly those in which the alkaline earth component of the base matrix is strontium or a combination of strontium and calcium.

A further aspect of the present invention provides methods of making phosphors, especially phosphors according to the aforementioned aspects of the invention. A method according to this further aspect of the present invention preferably includes the step of forming a crystalline matrix of a base material comprising one or more chalcogens selected from the group consisting of S and Se and one or more alkaline earths selected from the group consisting of Ca and Sr, and dispersing activators in the matrix. The matrix is exposed to a treating atmosphere comprising S vapor and Se vapor with any remainder most preferably consisting essentially of inert gas. This exposure occurs at an elevated exposure temperature sufficient to cause release of S and/or Se from the matrix and replacement thereof by components from the vapor. Following the exposing step, the exposed matrix is cooled to provide the finished phosphor. The duration of the exposing step and the concentrations of S and Se vapors in the treating atmosphere are selected so as to provide at least about $5 \times 10^{17}$ active sites in the the finished phosphor. Preferably, the step of forming the matrix and dispersing the activator in the matrix includes the step of firing a mass of a starting material comprising a matrix-forming material which may include one or more mixtures of alkaline-earth sulfides and/or selenides, the starting material preferably also including the activators and one or more fluxes. In this case, the exposing step is performed during the firing step, and the firing step includes the step of heating the starting material to the exposure temperature. In processes according to these preferred methods, the firing step serves to convert the matrix-forming material in the mass into the final matrix by recrystallization, and the matrix is exposed to the treating atmosphere while it is formed by this recrystallization process.

Ordinarily, the exposure temperature, and hence the temperature employed in the recrystallization process, is between about 900° and about 1200° C., more preferably between about 950° and about 1150° C. and most preferably between about 975° to about 1075° C. These temperatures are below the melting points of the alkaline earth sulfides and selenides preferably employed in the starting material. Thus, the process of recrystallization is believed to proceed by diffusion rather than by bulk melting and freezing of the sulfides and selenides. Under these conditions, the flux facilitates the recrystallization process.

Preferred processes according to the present invention differ markedly from the processes of the art, inter alia, in that the present processes employ appreciable concentrations of both S vapor and Se vapor in a treating atmosphere in contact with the matrix during the exposing step. The vapors in contact with the matrix may include at least some S and/or Se vapor released from the mass, i.e., from the matrix or from the starting material, and the exposing step may include the step of retaining vapors released from the mass in contact therewith. Thus, the vapors may be retained in contact with the matrix by keeping the mass in a closed or "semi-closed" vessel during firing. The term "semi-closed" vessel as used herein means a vessel which, although it allows some escape of vapors from the space within the vessel, nonetheless retards such escape. Where the starting material includes both S and Se, the S and Se vapors in the treating atmosphere can be derived entirely or principally from S and Se released from the mass. Particularly where the starting material or matrix prior to the exposure step is deficient in one of the chalcogens S or Se, that chalcogen may be supplied from an exogenous source, i.e., a source other than the starting material or matrix. Thus, where the process is conducted in a closed or semi-closed vessel, the exogenous source of sulphur and/or selenium would be disposed within the vessel along with the starting material. The exogenous source of sulphur and/or selenium, if employed, should be such as to generate appreciable quantities of S and/or Se vapors at the exposure temperature. For example, substantially pure sulphur is a satisfactory source of sulphur at the exposure temperatures normally utilized, whereas an alkaline earth selenide such as strontium selenide can be employed as an exogenous source of selenium vapor.

The process can also be performed without using a closed or semi-closed vessel. Thus, where the appropriate treating atmosphere is maintained within a furnace, as by passing a gas containing the appropriate chalcogen vapor or vapors through the furnace, the starting material and/or matrix may simply be disposed within the furnace. The treating atmosphere can be provided in the furnace by passing an inert gas through the furnace and placing chalcogen sources as aforesaid within the furnace, typically at or upstream of the starting material or matrix.

As set forth in detail in the aforesaid U.S. patent applications Ser. Nos. 842,731 and 603,304, it is believed that the sulphur and selenium in the treating atmosphere react with one another to produce complex species according to the general formula $S_nSe_m$ wherein n and m are integers, possibly both equal to one, and that the matrix absorbs these species during exposure to the treating atmosphere. Thus, it is believed that the active sites in phosphors according to preferred aspects of the present invention incorporate these complex species or incorporate matrix features such as dislocations, strains or the like created by absorption of the complex species in the matrix. Thus, according to this explanation, phosphors according to preferred aspects of the present invention can be characterized as containing an amount of the complex $S_nSe_m$ species effective to provide at least about $5\times10^{17}$ and preferably at least about $10^{18}$ active sites per cm$^3$. The preferred processes can likewise be characterized as providing quantities of the $S_nSe_m$ species in the treating atmosphere effective to enhance the luminescent properties of the phosphor, and preferably effective to provide the aforementioned numbers of active sites. However, the present invention, in its broadest compass, is not limited to phosphors or processes so characterized and is not limited by any theory or mechanism of operation.

Regardless of the actual physical basis for the success of the present processes, preferred processes according to the invention reliably form phosphors having the requisite number of active sites, and those phosphors reliably yield luminescent properties superior to the properties of the most comparable phosphors in the prior art.

These and other objects, features and advantages of the present invention will be more readily apparent from the detailed description of the preferred embodiments set forth below, taken in conjunction with the accompanying drawings

DETAILED DESCRIPTION OF THE PREFERRED EMBODIMENTS

Figure 1:
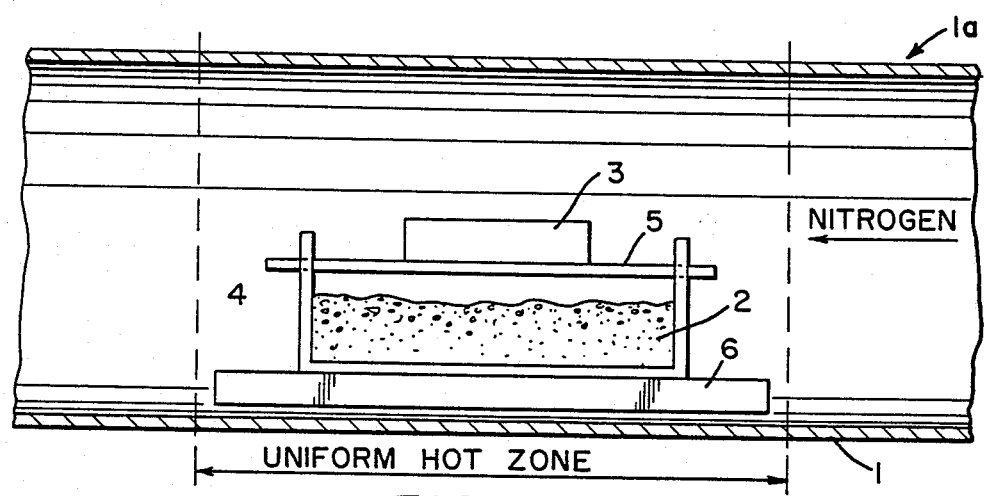
FIGS. 1, 2 and 3 are schematic views depicting apparatus used in three processes according to the present invention.

Apparatus employed in one process according to the present invention, as shown in FIG. 1, includes a horizontal electrical tube furnace 1A equipped with a quartz furnace tube 1. A pellet or mass 3 of starting material including an alkaline earth chalcogenide, a flux and compounds including the activators is positioned on refractory rods, which in turn are engaged with the wall of a refractory vessel or "boat" 4. An exogenous chalcogen source 2 in the form of a powder is disposed in the bottom of the boat, beneath rods 5. The boat rests on a refractory slab 6.

In the process, the slab, boat, rods, pellet and chalcogen source are loaded into the furnace while the same is cool typically at about room temperature. The furnace tube is evacuated and then purged with an inert gas before firing. In the firing step, the furnace tube is heated at a gradual rate to the desired exposure temperature, maintained substantially at the exposure temperature for a predetermined dwell time, and then gradually cooled back to about room temperature. During these steps, a gentle flow of the dry inert gas through the furnace tube is maintained. The furnace is arranged so that the entire boat and pellet are maintained within the "hot zone" of the furnace and hence maintained at substantially equal temperatures during the process.

As the pellet 3 of starting material and the chalcogen source are heated to and maintained at the exposure temperature, processes of crystal growth and diffusion occur within the mass. These processes typically do not involve melting of the alkaline earth chalcogenides in the pellet. The pellet as a whole typically remains in a solid or semi-solid form. Crystal growth phenomena occurring during the firing step convert the original crystalline matrix of the alkaline earth chalcogenides into a new crystalline matrix. As the new matrix is formed, the activators originally present in the starting material are dispersed within the new matrix. These processes of crystal growth and diffusion continue from the time the temperature reaches a sufficient value during the heating cycle, during the dwell period at the exposure temperature and during the initial portion of the cooling step, until they are substantially arrested as the temperature of the sample declines Concomitantly with these processes, appreciable quantities of chalcogen vapor are released from the mass, i.e., from the new starting material or from the crystalline matrix as the same is formed. Release of chalcogens from the mass continues while the pellet is at or above the dissociation temperature of the alkaline earth chalcogenides. Such release tends to create vacancies within the crystal lattice of the newly-formed matrix.

As the temperature increases during the firing step, chalcogen source 2 also begins to liberate significant quantities of chalcogen vapor. Thus, where the source 2 is a substantially pure chalcogen, the rate of vapor liberation rises with increasing vapor pressure as the furnace temperature increases. Where the chalcogen source is a chalcogen compound such as alkaline earth chalcogenide, the liberation of chalcogen vapor from the source proceeds by dissociation. A flux which melts at or below the exposure temperature may be added to an alkaline-earth chalcogenide to promote release of chalcogen vapors.

Chalcogen vapors liberated from pellet 3 and source 2 mingle with one another in the entered gas thereby bathing pellet 3 in a treating atmosphere including a mixture of these vapors. It should be appreciated that although there is some downstream flow of inert gas through the furnace tube during the process, this flow is relatively slow, so that appreciable quantities of chalcogen vapor from the pellet 3 remain in contact with the pellet itself. Thus, as the new crystalline matrix is forming, it is in contact with substantial amounts of the vapors evolved both from the matrix-forming materials in the matrix and from the exogenous chalcogen source 2. The matrix accordingly absorbs chalcogen-containing species from the vapors, thereby filling the vacancies created by release of chalcogens from the mass. Stated another way, chalcogens from the matrix are replaced by the vapors.

Figure 4:
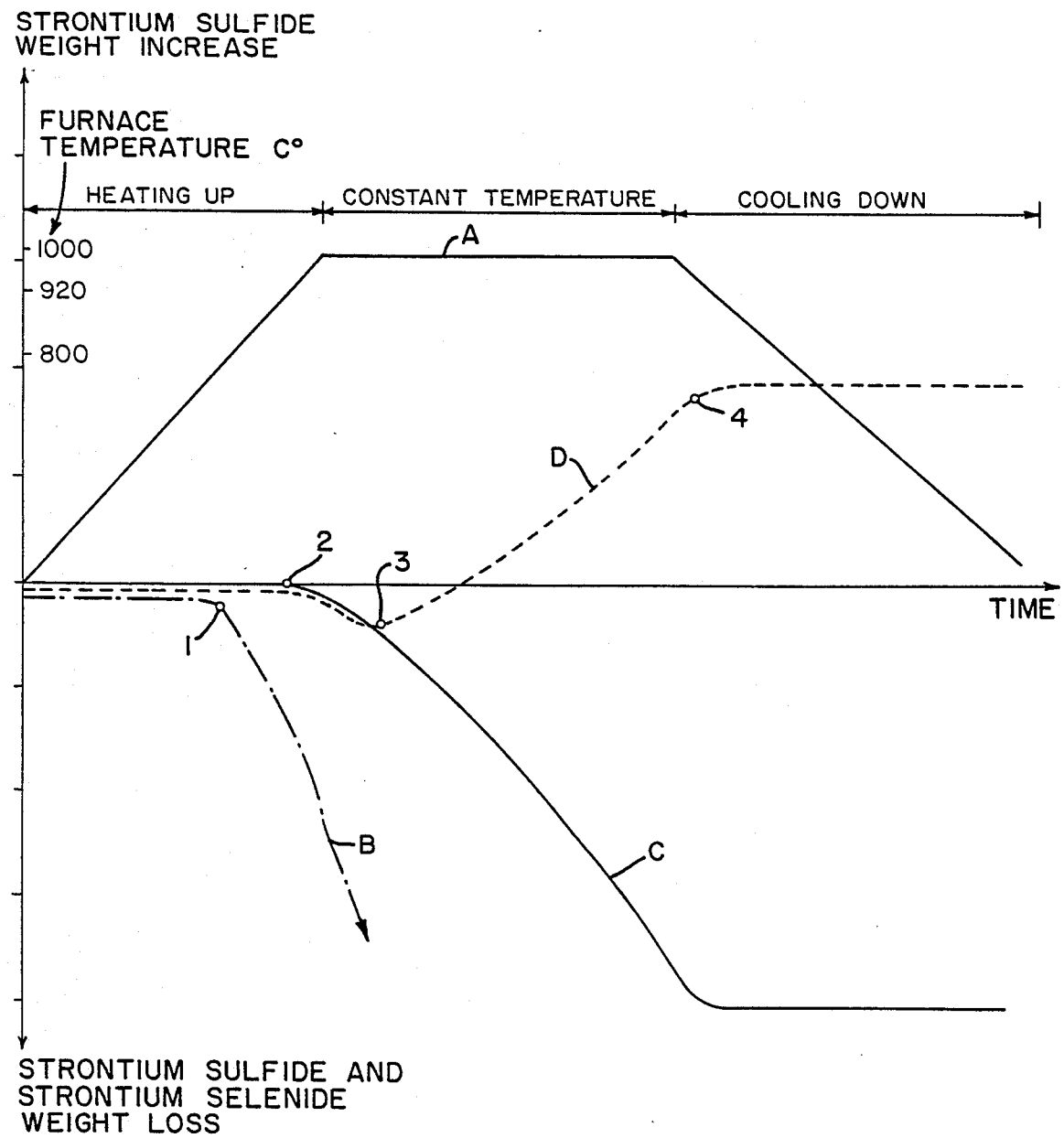
FIG. 4 is a graph illustrating temperature and weight variations during one typical process according to the present invention using the apparatus of FIG. 1.

FIG. 4 illustrates schematically the replacement phenomena. The graph of FIG. 4 shows data for processes in which strontium sulfide is the only alkaline earth chalcogenide component of the pellet 3 (FIG. 1) and strontium selenide is employed as the exogeneous chalcogen source 2. Curve A in FIG. 4 represents a plot of furnace temperature (vertical scale) vs. time (horizontal scale) for each of the procedures referred to in curves B, D, and D. Curve B represents a plot of weight loss (vertical scale) for the strontium selenide exogeneous chalcogen source against the same time scale as employed for curve A, for a test procedure wherein the strontium selenide is fired alone within the boat. Curve C shows the weight loss against time on the same scales as Curve B for the strontium sulfide containing pellet 3 in a further test procedure wherein the pellet is fired alone, without the strontium selenide containing chalcogen source. Curve D, plotted on the same scales as B and C, shows the changes in weight of the strontium sulfide based pellet fired with the strontium selenide chalcogen source in a procedure according to the invention.

Curve A shows that the temperature first increases at a moderate rate, typically about 10° C. per minute, followed by a dwell period at a substantially constant exposure temperature of 1,000° C., followed in turn by cooling at about 10° C. As shown by Curve B, the strontium selenide chalcogen source, when fired alone, begins to dissociate and lose weight at time T1, when the furnace reaches about 800° C. This weight loss continues progressively during the rising temperature and dwell periods, indicating that the strontium selenide is continually evolving selenium vapor during these portions of the process. As indicated by Curve C, the strontium sulfide based pellet, fired alone, begins to lose weight during the rising temperature portion of the firing cycle at time T2, when the furnace temperature reaches about 920° C., at which temperature there is some appreciable dissociation of strontium sulfide and liberation of sulphur vapors from the pellet. As further shown by Curve C, this weight loss of the pellet, fired alone, continues during the dwell period, indicating that the pellet, fired alone, would continue to evolve sulphur vapor during this period.

Curve D demonstrates that the variation in weight of the pellet is markedly different when the strontium sulfide based pellet is fired together with the strontium selenide based chalcogen source. In this case, as where the pellet is fired alone, there is no appreciable change in the weight of the pellet until time T2. Thus, there is no appreciable evolution of sulphur vapor from the pellet and no appreciable absorption of selenium vapor by the pellet during this interval. From time T2, when the dissociation of strontium sulfide at an appreciable rate begins, the pellet begins to lose some weight. This indicates that evolution of sulphur from the pellet predominates over any possible absorption by the pellet of materials from the vapor phase. At T3, about the time the furnace reaches the 1,000° C. constant exposure temperature, the curve of pellet weight versus time begins to turn upwardly, indicating that the pellet is absorbing materials from the vapor phase more rapidly than it is losing materials to the vapor phase. This absorption continues during the dwell period at the constant exposure temperature, and terminates at about T4, during the cooling phase of the firing cycle. Thus, from time T3 onward, absorption of chalcogens from the vapor phase predominates over loss of chalcogen from the pellet. The differences in weights between curves D and C represents the increment in weight caused by absorption and replacement of the released chalcogens from the pellet by the vapors. The absorbed species with the sulfide based pellet and selenide based chalcogen source clearly include selenium in some form, and the resulting phosphor accordingly incorporates selenium even though the original starting material did not. As explained above, it is believed that the absorbed species included in the final matrix and hence included in the phosphor after cooling include complex species of the form $S_nSe_m$, which constitute complex anions within the crystalline matrix.

Figure 5:
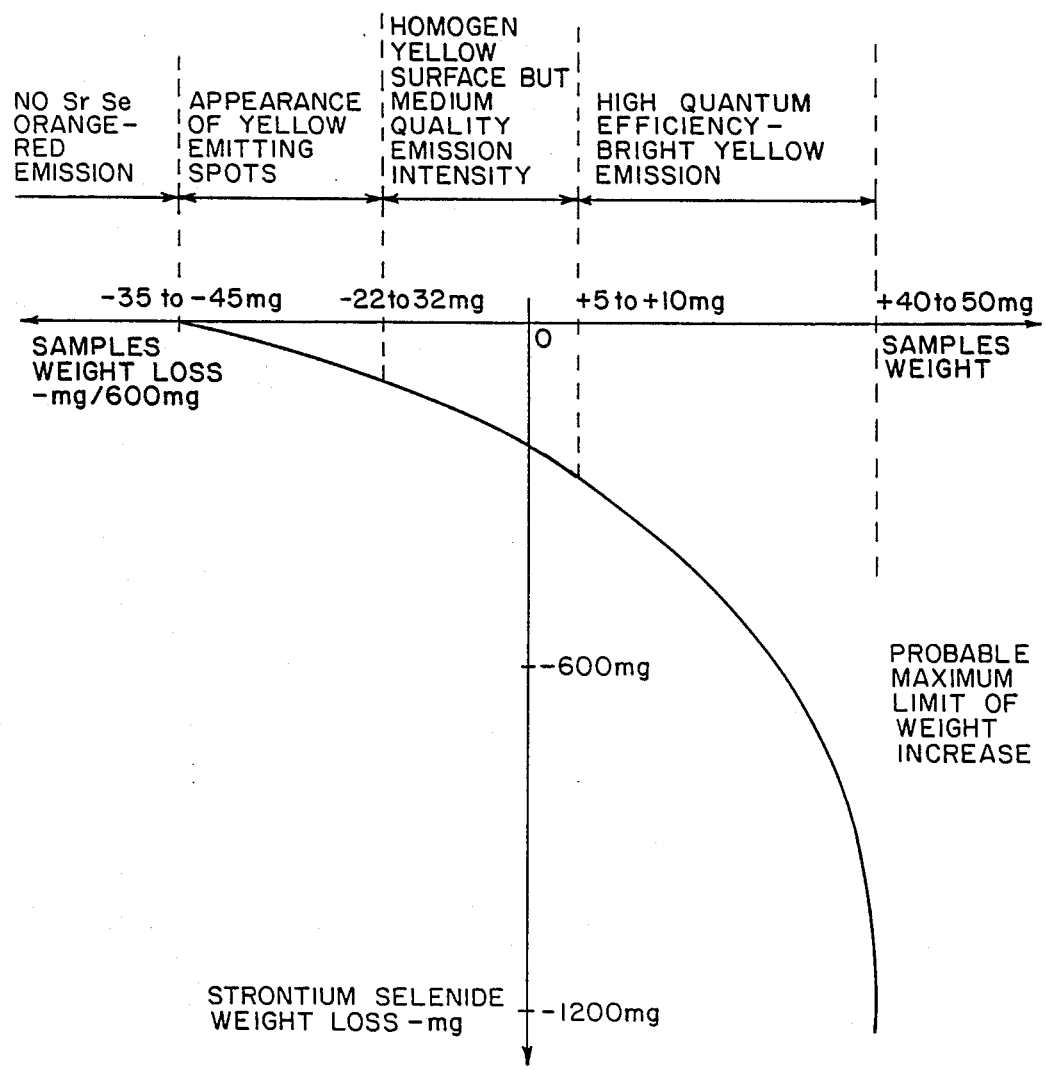
FIG. 5 is a further graph illustrating the interrelationship of weight changes and optical properties in processes using the apparatus of FIG. 1.

FIG. 5 shows the relationships between weight loss from the strontium selenide chalcogen source, weight gain of the strontium sulfide based starting material pellet together with the luminescent properties of the phosphor for various processes, conducted generally as described with reference to FIGS. 1 and 4 wherein each of the starting pellets incorporate the same europium-samarium activator system. Variables including the amount of strontium selenide chalcogen source, the presence or absence of a flux within the chalcogen source, the exposure temperature, the duration of the dwell period at the exposure temperature and the configuration of the "boat" were adjusted to adjust the amount of selenium vapor evolution from the chalcogen source. The point at the upper left hand end of the curve with zero strontium selenide weight loss and with a weight loss from the pellet or sample of −35 to −45 mg per 600 mg original pellet weight represents results from a test procedure with no strontium selenide chalcogen source, i.e., with the pellet fired alone. The remaining points on the curve, with progressively increasing strontium selenide weight loss, and with the pellet weight loss progressively decreasing and then changing to a pellet weight gain, represent progressively increasing amounts of selenium vapor evolution and hence progressively increasing amounts of selenium vapor in the treating atmosphere surrounding the pellet during the firing step.

All of the phosphors show infrared stimulatability. However, the phosphors prepared without selenium vapor present and hence without absorption of any selenium-containing species from the treating atmosphere, show the weak orange-red stimulated emission characteristic of europium samarium activated strontium sulfide phosphors of the prior art. With minor amounts of selenium vapor present, the phosphors show yellow-emitting spots on their surfaces during stimulation. As the amounts of selenium vapor present in the atmosphere increase, the stimulated emission of the resulting phosphors shifts to a substantially uniform yellow color. With still further increases in the amount of selenium vapor present and hence increases in the amount of selenium-containing species absorbed from the vapor phase, as reflected by the increasing weight gain of the pellet or sample, the stimulation quantum efficiency and hence the brightness of the yellow emission increases substantially. The correlation of luminescent properties with amounts of vapors present and with amounts of vapor absorbed shows the influence of species absorbed from the vapor phase upon the potency of the resulting phosphor. Thus, as the amounts of vapors absorbed increase, the potency and stimulation quantum efficiency of the resulting phosphor increase.

The influence on the luminescent properties of replacement by the chalcogen vapors of chalcogens present in the original starting material, and hence originally present in the matrix, is further demonstrated by nonuniformities in the resulting phosphors, where present. Thus, where the phosphor does not have uniform emission properties throughout, the central core region, remote from the pellet surface, generally shows the least color shift and the least increase in quantum efficiency, strongly indicating that the process proceeds by interaction with the surrounding treating atmosphere.

The configuration of the apparatus as illustrated in FIG. 1, and the process conditions can be varied. Thus, the mass of starting material which forms the matrix need not be in the form of a pellet, but can instead be in powder form, disposed within a crucible. If desired, the chalcogen source can be incorporated with the matrix-forming material in the mass. Also, the chalcogen source can be disposed upstream of the starting material, i.e., towards the end of the tube where the nitrogen enters the furnace. The chalcogen source need not extend beneath the sample as illustrated in FIG. 1. The rate of dissociation of a strontium selenide chalcogen source can be controlled by controlling its particle size, the dissociation rate being increased by a grinding to a fine powder. Also, addition of fluxes such as calcium fluoride, strontium sulphate and the like to the strontium selenide chalcogen source tends to increase its rate of dissociation. Further, the weight loss of a strontium selenide chalcogen source under otherwise similar conditions depends upon its purity and method of preparation. Also, chalcogen sources other than strontium selenide can be employed. Pure selenium or selenium containing a minor amount of lithium fluoride can be used as the exogenous chalcogen source where selenium vapors are desired, but should be located in a region of the furnace upstream of the starting material or pellet and maintained at a somewhat lower temperature than the temperature of the pellet so as to control the rate of selenium evaporation. A mixture of 60 parts strontium oxide and 40 parts selenium can be employed as a source of selenium vapors and maintained at the exposure temperature, in close proximity to the starting material or pellet, during the firing step. Such a mixture tends to evolve considerable selenium during the initial rising temperature phase of the process, but still retains some selenium when the temperature reaches the desired exposure temperatures. This retained selenium is released at about the desired exposure temperatures and hence provides the requisite selenium vapors in the treating atmosphere.

The dwell time at the exposure temperature can be varied, with larger samples or pellets of starting material generally requiring greater dwell times. Typically, dwell times between about 10 and about 200 minutes can be employed, and dwell times between about 30 and about 90 minutes, most preferably about 60 minutes, are generally useful. These preferred dwell times are particularly useful with about one gram of starting material. Exposure temperatures above about 900° C., preferably between about 900° and about 1200° C. can be employed, temperatures between about 950° and about 1150° C. being more preferred, about 950° to about 1100° C. being more preferred and about 975° to about 1075° C. being most preferred.

The inert gas flow rate can be varied, but preferably should be selected according to the cross sectional area of the furnace tube to provide a relatively gentle, slow flow of inert gas downstream along the tube. Thus, inert gas flow rates which provide average downstream velocities on the order of about 2.5 cm/min have been used with good success. Any gas which is substantially inert to the starting material and to the resulting phosphor at the temperatures employed in the process. Thus, nitrogen, argon, helium and the like can be employed.

Figure 2:
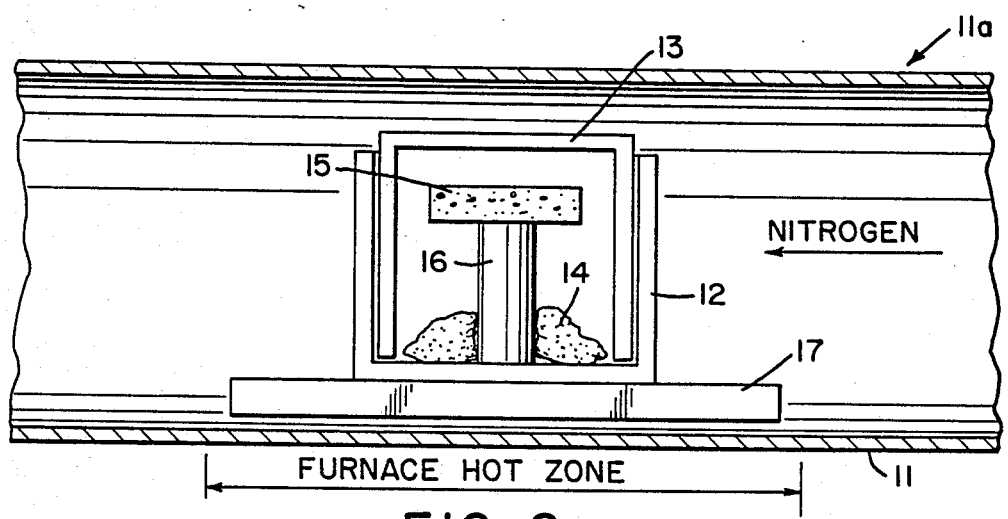

FIG. 2 illustrates apparatus employed in a further process according to the present invention. In this embodiment, a first crucible 12 and a second crucible 13 fitted upside down within the larger first crucible cooperatively define a "semi-closed" vessel, i.e., a vessel which although not hermetically sealed nonetheless substantially retards escape of vapors from within the vessel. The chalcogen source 14 is disposed in the bottom of the first crucible, whereas a pellet of starting material 15 is supported within the vessel, above the chalcogen source, by a refractory tube 16, so that the starting material or pellet 15 is out of contact with the chalcogen source. First crucible 12 is supported within the furnace on a refractory slab 17, the entire assemblage being disposed within the tube of a furnace 11a substantially similar to that discussed above in connection with FIG. 1.

In a process employing this apparatus, the procedure utilized is generally similar to that described above with reference to FIG. 1. Thus, the apparatus including the pellet or starting material and the chalcogen source is disposed within the furnace tube while the tube is cool, preferably at about room temperature. After evacuation and purging with inert gas, the temperature of the furnace is gradually increased until it reaches the desired exposure temperature, maintained at the desired exposure temperature for a predetermined dwell time, and then gradually reduced to about room temperature. Inert gas flow is maintained through tube 11 during these stages in the procedure. As in the procedure described above with reference to FIGS. 1, 4 and 5, the chalcogen source 14 releases chalcogen vapors, which mingle with chalcogen vapor released from the sample or pellet 15. The alkaline earth chalcogenides in the starting material form a new crystalline matrix, and activators in the starting material or pellet 15 are dispersed in this new crystalline matrix as well. Vapors released from the pellet are replaced by vapors absorbed from the surrounding treating atmosphere within the semi-closed vessel defined by crucibles 12 and 13. As will be appreciated, retention of the vapors released both from mass or pellet 15 and from chalcogen source 14 by the semi-closed vessel materially increases the concentrations of these vapors in the treating atmosphere within the semi-closed vessel.

The degree of vapor retention of course will depend on the exact configurations of the crucibles, the tightness of the fit therebetween and the like. A practical measure of the degree of retention can be obtained by comparing the weight loss of an arbitrary alkaline earth/chalcogen composition fired in the semi-closed vessel, without any exogenous chalcogen source, to the weight loss of the same sample fired in the same vessel under the same conditions but with the vessel in an essentially open condition, i.e., in the case of the vessel as shown in FIG. 2, without second crucible or cover 13. The ratio of the weight loss from the sample with the vessel open to the weight loss with the vessel in the semi-closed condition is referred to herein as the "retention ratio," higher retention ratios indicating a more tightly closed vessel. As will be appreciated the retention ratio will vary with the composition of the sample used to determine it, the firing temperature regime, and the ratio of semi-closed vessel internal volume to sample volume. Unless otherwise specified, retention ratios given in this disclosure should be understood as measured using a test composition originally consisting of 10 parts SrSe, 0.9 parts $CaF_2$, 0.004 parts $Sm_2(SO_4)_3$, 0.005 parts $Eu_2(SO_4)_3$, with a semi-closed vessel internal volume to sample volume ratio of 25:1, using a firing regime comprising a 20° C./min temperature rise to 1000° C., 60 minutes dwell at 1000° C. followed by cooling to room temperature at about 10° C./min, with all steps of the firing regime conducted in nitrogen flowing through the furnace tube at about 2.5 cm/min velocity. Preferably, the retention ratio of the semi-closed vessel as so determined should be at least about 1.5, more preferably at least about 2. Still higher retention ratios can also be employed and are more preferred. As will be appreciated, the higher the retention ratio, the lower the loss of vapors from the semi-closed vessel during the firing regime and hence the higher the concentration of chalcogen vapors in the treating atmosphere. Fully closed, i.e., hermetically sealed, vessels can also be employed.

The concentration of chalcogen vapors in the treating atmosphere within the vessel is also influenced somewhat by the size of the vessel. Preferably, the ratio of vessel internal volume to weight of starting material 15 is about 25:1 or less, and the ratio of internal volume to starting material volume is about 10:1 or less.

The preferred firing times, exposure temperature and the like for use with the apparatus as shown in FIG. 2 are generally similar to those employed with the apparatus of FIG. 1. Processes employing semi-closed vessels, such as the arrangement illustrated in FIG. 2, are particularly useful with starting materials which initially contain selenium. Typically, with starting materials where selenium is the predominant or only chalcogen, the exogenous chalcogen source will be selected to liberate sulphur vapor during the firing cycle. Essentially pure sulphur is one such suitable chalcogen source.

As will be appreciated, the semi-closed vessel apparatus can be varied considerably from the particular form shown in FIG. 2. For example, the mass starting material in this apparatus as well need not be in the form of a pellet, but may instead be in powder form. One such arrangement for processing powder form starting material may have the powder form starting material contained in an open crucible disposed within the semi-closed vessel so as to keep the starting material from blending with the exogenous chalcogen source. However, the chalcogen source can also be blended with the starting material. In a further variant, no exogenous chalcogen source is employed. That is, the chalcogen vapors contained within the semi-closed vessel consist essentially of chalcogen vapors liberated from the mass, i.e., from the starting material and/or from the crystalline matrix formed during the process. In a process which employs only chalcogen vapors liberated from the mass, the starting material should include both sulphur and selenium.

Figure 3:
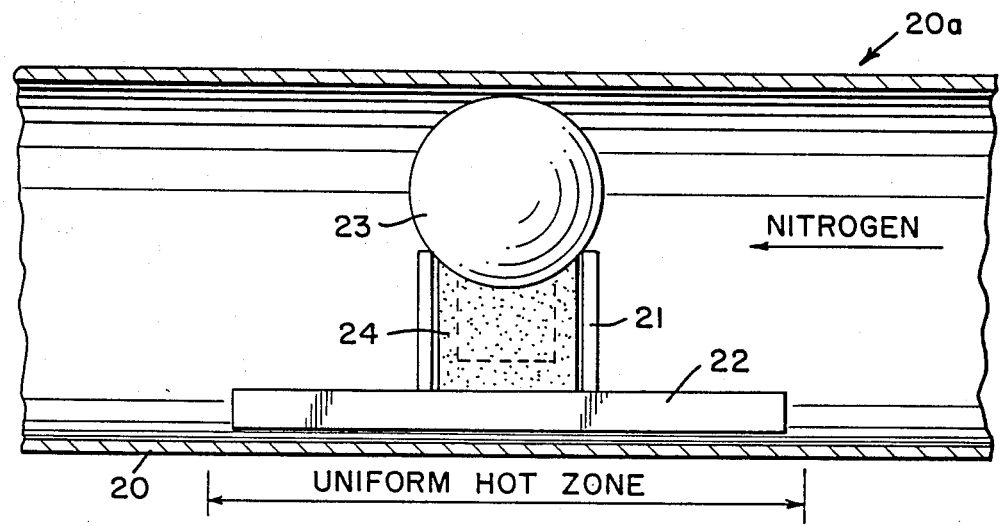

A variant of the semi-closed vessel apparatus is illustrated in FIG. 3. In this variant, the semi-closed vessel is defined by a refractory tube 21, refractory slab 22 and refractory ball 23. This apparatus is used with powder-form starting materials fired without an exogenous chalcogen source, such as starting materials including both alkaline earth sulfides and selenides together with the desired activators and typically one or more fluxes. Preferably, the powder form starting material is tightly packed within tube 21 before firing. However, there are small interstitial voids even in the packed material. These voids are filled with sulphur and selenium vapors liberated from the mass during the recrystallization.

The starting materials employed in the processes as described above incluee alkaline earth metals selected from the group consisting of strontium, calcium and mixtures thereof and one or more chalcogens selected from the group consisting of sulphur and selenium. As mentioned above, the preferred starting materials include one or more alkaline earth chalcogenides, i.e., SrS, SrSe, CaS and CaSe or combinations thereof. The strontium compounds are generally preferred.

In the preferred processes of the present invention, the crystalline matrix is formed by recrystallization at temperatures below the melting points of the alkaline earth chalcogenides. In these processes, the starting material should include a flux. The flux preferably is substantially non-reactive with the alkaline earth chalcogenides and with the activators and also preferably is substantially insoluble in the crystalline matrix formed during the process. That is, the flux should have relatively little tendency to form solid solutions with the crystalline matrix during the recrystallization operation. Particular fluxes which are preferred in procedures according to the present invention include $CaF_2$, $SrF_2$, LiF, $MgF_2$, NaCl, $SrSO_4$, $SrCl_2$, SrO and $SrSO_3$ and mixtures of these. Of these, fluxes which incorporate strontium or calcium cations are preferred. $CaF_2$ may be employed successfully either as a single flux or in conjunction with another flux such as $SrSO_4$.

In making an IR-stimulable phosphor, the quantity of flux employed preferably is between about 1 and about 25% by weight, more preferably between about 6 and about 18% by weight, and most preferably between about 6 and about 12% by weight, based upon the total weight of alkaline earth chalcogenides in the starting material. In making a phosphorescent phosphor, the quantity of flux preferably is about 1% to about 8% by weight, and more preferably about 1% to about 6% by weight, on the same basis. Depending on its composition, the flux may react during the firing step, as by reaction with the chalcogen vapors, or may be ionized and dispersed in the matrix to some extent. The term "flux residue" as used in this disclosure refers includes both a flux in its original state and the products of these decomposition processes.

The nature of the active sites incorporated in the phosphor, and hence its luminescent properties, will depend upon the nature of the activators. Metallic activators are incorporated in the starting material as salts, preferably chloride or sulfate salts. The term "activator pair" as used herein refers to a system of two activators used together in a single phosphor. It is believed that the two activators in such a pair coact with one another and with the crystalline matrix to define active sites. Typically, in a given crystalline matrix, one activator, referred to herein as the "dominant" activator, appears to have a predominant influence on the emission wavelength exhibited by the active sites and hence by the phosphor as a whole whereas the other activator, referred to herein as the "auxiliary" activator ordinarily has a lesser influence on the absorption and emission wavelengths but a greater influence on the height of the energy barrier in the active sites. Thus, for a given crystalline matrix, the choice of auxiliary activator predominantly determines whether the material is phosphorescent or infrared stimulable, and, if infrared stimulable, what its stimulation spectrum will be.

Particularly preferred activator systems are pairs of activators including Eu with Sm, Bi or both to provide an IR-stimulable phosphor. Although a system including all three activators would provide IR-stimulable properties, systems including only two of these activators are more preferred. The combination of Eu and Cu activators provides a phosphorescent phosphor, as noted above. It is also possible, although generally not desired, to prepare phosphors with mixed stimulable and phosphorescent activity, as by including Cu in a mixture with Sm and/or Bi in an activator system which also includes Eu.

Preferred concentrations for the activators are about 5 to about 500 parts per million by weight of each activator based upon the total weight of alkaline earth chalcogenides in the starting material. Concentrations of about 10 to about 300 parts per million by weight, on the same basis, are particularly preferred.

Among the other activators which can be used in accordance with the present invention to provide various luminescent properties are transition elements and heavy metals, such as Gd, Dy, Lu, Yb, Tm, Er and Tb. Other activator systems including single activators and activator pairs reported in the literature as useful to provide different luminescent properties in activated alkaline earth/chalcogen phosphors may be utilized in phosphors according to the broadest aspects of the present invention. Among the activator systems which have been reported in the literature as useful in certain IR-stimulable alkaline earth/chalcogen phosphors include Cu, Ce, Sn, Mn or Eu paired with Sm, or Sn, Bi or Sm paired with Eu. (Urbach et al., *On Infrared Sensitive Phosphors*, J. Optical Society of America, Vol. 36, No. 7, pp. 372-381 (1946)) and Ce alone (Banks & Ward, Luminescence and Conduction in Solid Solutions of Cerium Sulfide in Strontium Sulfide, J. Electrochemical Society, Vol. 96, p. 297 et seq. (1949)). The literature also reports the following activator systems as useful to provide phosphorescent behavior in certain alkaline earth/chalcogen phosphors: Sb alone (Yamashita, Luminescent Centers of Calcium (SiSe) Phosphors, J. Physical Society of Japan, October, 1973, p. 1089 et seq.); Pb paired with Bi (U.S. Pat. No. 2,458,286); and Cu paired with Bi (U.S. Pat. No. 2,475,437). U.S. Pat. No. 4,442,377 lists many different activators or "dopants" as useful in an electroluminescent alkaline earth/chalcogen phosphor. The list of "dopants" in the '377 patent is incorporated by reference herein. Cu, Ag, Au, halogens, alkali metals, Rb and P are reported as useful activators to provide cathodoluminescence in alkaline earth/chalcogen phosphors (Lehmann, Alkaline Earth Sulfide Phosphors Activated by Copper, Silver and Gold, J. Electrochemical Society, pp. 1389 (November 1970)).

With the preferred Eu:Sm, Eu:Bi and Eu:Cu activator pairs, the emission radiant energy is in the visible range, within the range from orange to green. With any of these activator systems, the emission color can be shifted towards the green end of the spectrum by increasing the selenium content of the phosphor, and towards the orange by increasing the sulphur content. A phosphor between the orange and green extremes, having a yellow emission color and an emission peak at about 560-575 nm is preferred, inasmuch as these wavelengths correspond substantially to the peak sensitivity of the dark-adapted human eye. With the activator systems, where the phosphor is prepared with strontium as the sole alkaline earth and without the use of an exogenous chalcogen source, starting materials including about 20-40 weight % (25.8-48.1 mole %) strontium sulphide and 80-60 weight % (74.2-51.9 mole %) strontium selenide, are preferred, about 30 weight % (37.4 mole %) strontium sulphide and 70 weight % (62.6 mole %) being particularly preferred. Similar proportions, by mole %, are employed where calcium is included along with strontium. All of these percentages are based on the total alkaline earth chalcogenides. The molar ratio of sulphur to selenium in the finished phosphor typically will differ from the molar ratio in the starting material, particularly where an exogenous chalcogen source is employed. Preferably, the molar ratio of S to Se is between about 1:10 and 10:1 in system using Eu:Bi or Eu:Sm activators. With the Eu:Cu activator system, the S:Se molar ratio in the finished phosphor preferably is at least about 1:10. In general, substitution of calcium for strontium in phosphor having the preferred activator systems, as by substituting calcium selenide for strontium selenide or calcium sulphide for strontium sulphide results in displacement of the emission spectrum towards longer wavelengths. With the Eu:Cu activator, amounts of calcium less than 90% by weight are preferred, less than 50% being more preferred, 0% calcium (100% strontium) being most preferred.

As in other phosphor preparations, contaminants in minor amounts can affect the results achieved. Therefore, it is important to use the purest available starting reagents and to avoid contamination during the process. Reagents available commercially under purity grades "TMI 10" and "TMI 25" from Spex Industries, Inc. of Metuchen, N.J. USA generally are suitable for use in the process. The implements which contact the starting materials and/or the finished phosphor during the process should be formed from materials which are substantially inert to the system and which do not release any appreciable contaminants into the system. Alumina implements generally provide satisfactory results. The inert gas used in the process should likewise be selected to avoid contamination. Nitrogen containing no more than 2 ppm oxygen by volume and no more than 3 ppm water vapor by volume as supplied to the experimental apparatus typically is satisfactory. The solid reagents utilized in preparation of the phosphor preferably are ground, as by grinding in a ball mill with acetone and then evaporating the acetone. After grinding, the reagents preferably are dried, after grinding, under an atmosphere of dried inert gas at a temperature of at least about 100° C. for several days, so as to assure that the reagents do not contain any appreciable moisture at the commencement of the firing step. The phosphors themselves are hygroscopic and can be damaged by moisture absorbed from the atmosphere. Accordingly, as with other alkaline earth/chalcogen phosphors, phosphors according to the present invention should be protected from atmospheric moisture, as by packaging in sealed containers, preferably with dessicants. Also, if the phosphors or the reagents are handled in the laboratory atmosphere, the humidity of the laboratory desirably is minimized.

The examples set forth below illustrate certain features of the present invention. Unless otherwise stated, each of the precautions mentioned in the preceding paragraph were applied in all of these examples.

The optical properties of the phosphors in the examples are measured using a Fluorolog instrument with a Scamp microprocessor control (both as supplied by Spex, Inc., Metuchen, N.J.), a 450 watt mercury vapor lamp light source, a thermoelectrically cooled Ga As photomultiplier tube with a dark count less than 30 photons per second and having a measurement range of 180-860 nm. A GaAs infrared emitting diode with a mechanical shutter is employed as the stimulation source. The absorption spectrum is measured by exposing the sample to exciting radiant energy of 10 nm bandwidth in a preselected region of the 200-nm-800-nm range. As the phosphor absorbs the exciting radiant energy, it typically starts to emit radiant energy by fluorescence at wavelengths close to its stimulated emission wavelengths. When the phosphor has absorbed all of the energy it can store, the brilliance of this fluorescence reaches a substantially constant value, indicating that the phosphor is fully "charged." All samples are exposed to the exciting radiant energy for a time sufficient to reach this steady-state value, typically five minutes. IR-stimulable phosphors are held at rest for one minute, and then exposed to infrared radiation. The total energy released by stimulated emission to exhaustion, i.e., until the stimulated emission substantially ceases, was measured. The wavelength of the exciting radiant energy is changed by a 10 nm step, and the process is repeated again, with further steps at further repetitions of the process until the entire range of 200 nm-800 nm has been covered. The plot of total energy released upon stimulated emission in each step versus wavelength of the exciting energy gives a plot of energy absorption versus exciting radiant energy wavelength. Similar measurements of the degree of stimulated emission versus wavelength of the stimulating radiation give the stimulation spectrum.

The stimulation quantum efficiency is measured by comparison with a commercially available, standard strontium sulphide based infrared phosphor available from Eastman Kodak Company under the designation "Kodak IR Phosphor", also referred to as a "U-70" phosphor. This standard commercial material is reported in the literature, including the manufacturers literature, to have a quantum efficiency of about 1.0%. Thus, after the material has absorbed as much energy as possible from exciting radiant energy, each 100 photons of infrared energy most closely matched to the stimulation peak of the material will release only one photon of emitted light. In measurements for the present examples, the ratio of incident stimulating IR radiation to emitted light provided by the Kodak IR Phosphor under conditions set to optimize its response is taken as representing a quantum efficiency of 1%. The stimulation quantum efficiency of the present phosphors is determined by comparison with results achieved with the U-70 material. The number of active sites in the phosphor can likewise be calculated by comparison with the known properties of the U-70 material.

Unless otherwise stated, optical properties of phosphors stated in this disclosure are measured as stated above.

EXAMPLE 1

Starting material comprising 10 g of strontium sulphide, activators consisting of 0.004 g samarium sulphate and 0.005 g europium sulphate and fluxes consisting of 0.9 g calcium fluoride and 0.9 g strontium sulphate was prepared by grinding and drying at 100° C. after grinding and then pressed into 16 mm diameter pellets weighing 1 g each under 3-4 tons pressure, and dried once again at 100° C. for several days. A starting material pellet is fired using apparatus substantially as indicated in FIG. 1, with a 50 mm diameter quartz furnace tube 1 and an alumina boat 4 about 50 mm long, 30 mm wide and 10 mm high. 4 g strontium selenide is spread evenly within the boat and acts as the chalcogen source in the process. The pellet is supported on alumina rods above the chalcogen source.

Before firing, the furnace tube is evacuated to 0.02 millibars and nitrogen is passed through the furnace tube at a flow rate of 50 ml/min. The firing cycle includes heating at an average rate of about 10° C./min to a 1000° C. exposure temperature, followed by a 60 minute dwell period at the exposure temperature and cooling at about 10° C./min to about room temperature, the nitrogen flow being continued until the end of the cooling phase.

After the firing step, the pellet weighs 20 mg more than before firing. The resulting pellet is an infrared stimulable phosphor. The energy absorption reaches a maximum at one peak in the ultraviolet range and a further maximum at around 450 nm in the blue visible range. The emission spectrum or spectral distribution of the light emitted upon stimulated emission extends from about 530 nm to about 640 nm, with a peak around 575 nm. The emitted radiant energy is a brilliant yellow color. The IR stimulation spectrum extends from about 800 nm to about 1200 nm, with a peak between about 950 and about 1050 nm. Upon various repetitions of the example procedure, the stimulation quantum efficiency ranges from about 8% to about 11%.

EXAMPLE 2

A starting material consisting of 10 g strontium selenide, 0.9 g calcium fluoride flux, and activators comprising 0.004 g samarium sulphate and 0.005 g europium sulphate is prepared and pressed into 16 mm diameter, 1 g pellets using techniques substantially as employed in Example 1. These starting material pellets are then fired using apparatus substantially as described above with reference to FIG. 2. With cover or second crucible 13 (FIG. 2) in place, the two crucibles 12 and 13 define a semi-closed vessel having an interior volume of 10 cm$^3$ and the vessel has a retention ratio of about 2.2. The furnace has a tube of about 50 mm inside diameter, and nitrogen is passed through the tube at 45 ml/min during each firing operation. In each firing operation, the temperature of the furnace, with the pellet inside, is raised from about room temperature to an exposure temperature of about 1000° C. at a heating rate of about 20° C./min, maintained at the exposure temperature for a dwell period of 60 minutes and cooled to approximately room temperature.

Figure 6:
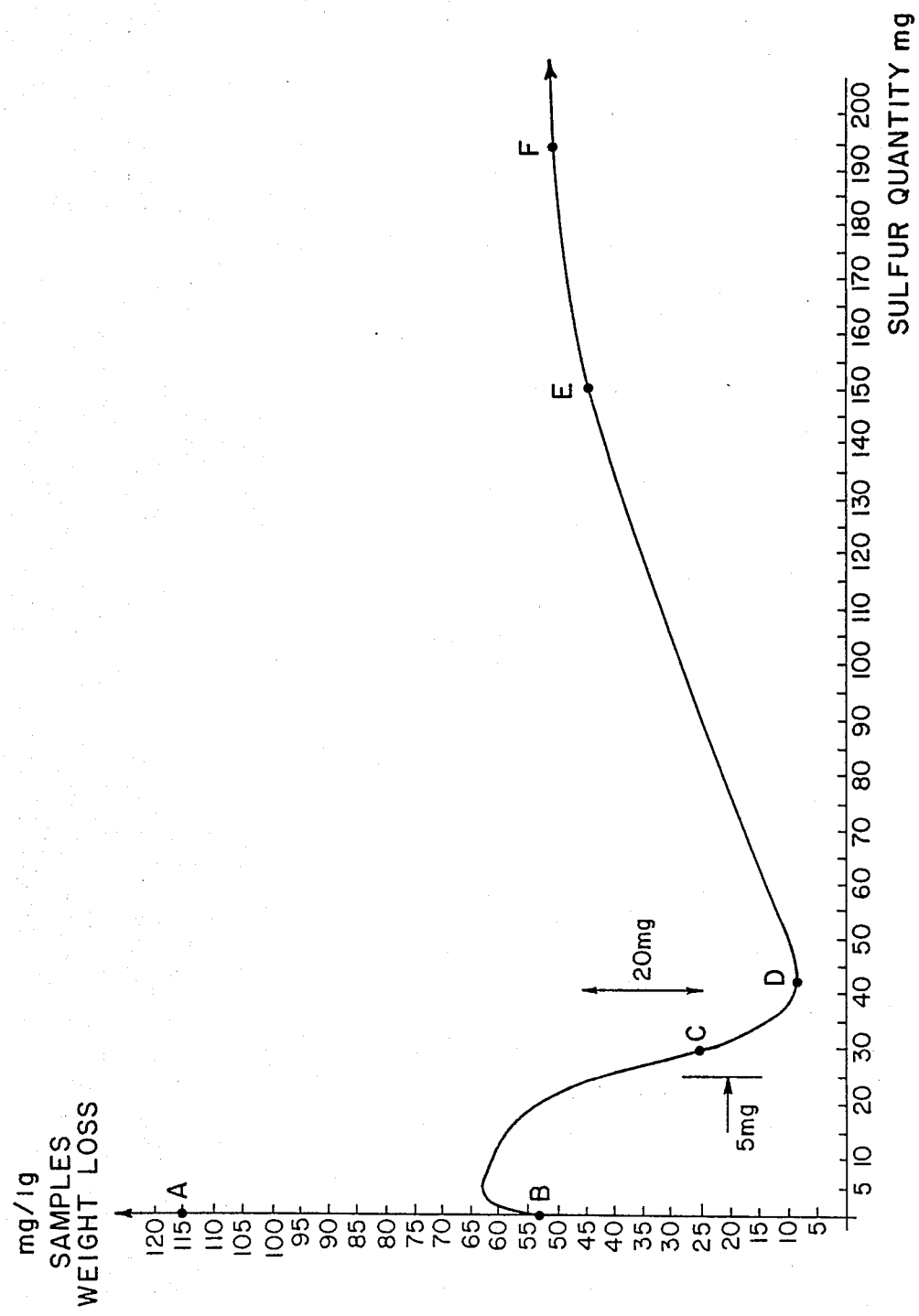
FIG. 6 is a further graph illustrating certain interrelationships for processes using apparatus as shown in FIG. 2.

A series of runs are performed, using a different pellet on each run, with the vessel open (cover 13 missing) and with quantities of a pure sulphur chalcogen source in the bottom of crucible 12, in each case as indicated in Table I below. The weight loss from the pellet, emission color and emission brightness for the various samples are also shown in the table. The pellet weight loss and quantity of sulphur chalcogen source are also plotted in FIG. 6.

TABLE 1

| Sample | Cover Present or Absent | Sulphur Quantity (Mg) | Pellet Weight Loss (Mg) | Emission Color | Stimulated Emission Brightness |
|---|---|---|---|---|---|
| A | Absent (Open Vessel) | 0 | 115 | — | Not Detectable |
| B | Present (Semi-closed vessel) | 0 | 52 | Green | Weak |
| C' | Present | 25 | 45 | Yellow-Green | Stronger than B |
| C | Present | 30 | 25 | Yellow-Green | Stronger than C' |
| D | Present | 40 | 10 | Yellow | Strongest |
| E | Present | 150 | 45 | Yellow-Orange | Approx. same as D |
| F | Present | 195 | 51 | Orange | Approx. same as D |

Sample A is simply a strontium selenide based phosphor fired in an open vessel without any present. The large weight loss indicates substantial evolution of selenium from the pellet without any appreciable replacement, and hence indicates the presence of substantial anion vacancies in the crystal matrix. The sample shows almost no activity as a stimulable phosphor. Sample B, likewise fired without sulphur but in the semi-closed vessel shows some fluorescence upon exposure to exciting radiation and some weak stimulatability with both fluorescence and stimulated emission in the green range of the spectrum. The weight loss is approximately 60 mg less than the weight loss observed in the open vessel, indicating that the closed vessel retained substantial quantities of selenium vapor in contact with the sample, which vapors were reabsorbed into the sample during the recrystallization.

The comparison of Samples B, C' and C shows progressive shift in the color of the stimulated emissions from green towards yellow and progressive increase in the intensity of the stimulated emission, indicating an increase in the number of active sites with increasing quantities of sulphur vapor in the treating atmosphere.

Moreover, the relationship between weight loss and quantity of sulphur present in this region of the curve (FIG. 6) is instructive. Comparing Samples B and C, presence of 30 mg sulphur chalcogen source in the system results in a decrease in weight loss from 52 to 25 mg, i.e., a decrease of 27 mg. Thus, the decrease in weight loss is almost equal to the total quantity of sulphur chalcogen source used. This result is surprising, inasmuch as some of the sulphur vapor would undoubtedly escape from the semi-closed vessel. The comparison between samples C and C', is even more striking. In run C, only 5 mg more sulphur chalcogen source is employed than is used in run C', but the weight loss from the pellet is some 20 mg less for Sample C than for Sample C'. In this range of sulphur quantities, a small increase in the amount of sulphur chalcogen source causes a much greater reduction in weight loss from the pellet during firing. These results strongly indicate that the sulphur vapor interacts with the selenium vapor so that the presence of sulphur vapor has an effect aside from simple replacement of selenium by sulphur in the crystal matrix. Indeed, if the only effect of the sulphur chalcogen source and sulphur vapors evolved therefrom were to promote replacement of selenium by sulphur, then the curve of sample weight loss (FIG. 6) versus sulphur quantity would be expected to slope upwardly from point B at all locations. Sulphur has a lower atomic weight than selenium and hence simple replacement of selenium by sulphur would lead to increased weight loss. In the region from point C', to point C, the curve of weight loss versus sulphur quantity has a negative slope, with a magnitude greater than one. This region of the curve thus can be characterized as the "steep-negative" slope region, and the quantities of sulphur utilized for Samples C', and C can be characterized as quantities of which are sufficient to reach the steep-negative region of the weight loss/sulphur quantity curve. Where a selenide-based starting material is fired with a sulphur chalcogen source, the better phosphors generally are formed with sulphur quantities equal to, or, preferably, greater than the minimum amount required to reach the steep-negative slope region. In this system, the steep-negative slope region starts at approximately 25 mg sulphur chalcogen source, i.e., about 25 mg sulphur. As each pellet contains 0.917 g SrSe, and hence about 0.0055 moles SrSe, the steep-negative slope region of the curve can be said to commence at about 0.145 moles sulphur chalcogen source per mole selenium included in the starting material for this system.

The results observed in the steep-negative slope region of the curve are consistent with reaction between S and Se in the gas phase to produce complex $S_nSe_m$ species and absorption of those species by the crystalline matrix as anions. Thus, such reaction and absorption of the complex species would account for the steep negative slope of the curve and the profound reduction in weight loss upon a relatively minor increase in sulphur chalcogen source quantity.

Sample D shows still less weight loss than Sample C, and represents a minimum in the weight loss curve. This sapple provides the best luminescent behavior of all samples in the series. It shows a yellow stimulated emission and the highest emission brightness upon stimulated emission of all samples, indicating that this sample has the highest number of active sites of all samples in the series. Sample E, made with still more sulphur chalcogen source, shows a greater weight loss than Sample D, indicating the effects of additional simple replacement by sulphur of selenium competing with other effects occurring in the system. This sample has stimulated emission shifted towards the orange region from that observed with Sample D, but nonetheless shows total stimulated emission and quantum efficiency comparable to that of Sample D, and hence has approximately the same number of active sites. With still greater quantities of sulphur chalcogen source, this effect continues, and the emission color shifts further towards orange. Beyond about 195 mg sulphur chalcogen source (Sample F) no further effect is observed, indicating that the absorption of sulphur by the sample is limited by factors other than the quantity of sulphur vapor present in the system such as the rate of selenium evolution and hence the rate of vacancy creation in the sample itself.

The optimum sample of this series (Sample D) has absorption and emission characteristics generally similar to the sample of Example 1, but has a quantum efficiency of 14%, and hence has somewhat more active sites than the sample of Example 1.

EXAMPLE 3 (COMPARATIVE EXAMPLE)

A mixture comprising 7 g SrSe, 3 g SrS, 0.005 g europium sulphate, 0.004 g samarium sulphate and 0.9 g calcium fluoride flux is prepared and ground in a plastic jar with alumina grinding balls for 30 minutes at 20° C. and 35% relative humidity for 30 minutes. A 1.09 gram portion of this mixture is blended with 0.09 g strontium sulphate and the blended mixture is ground again for five minutes to prepare the starting material utilized in the firing step. Two 13 mm diameter pellets weighing approximately 0.5 g each are pressed from this mixture, each under three tons force at 20° C., 40% relative humidity and stored in a dessicator together. The two pellets are fired simultaneously in separate tubes in a multi-tube furnace, both tubes passing through the same region of the furnace and hence both being maintained at the same temperatures throughout the firing step. Both pellets are fired using apparatus similar to that illustrated in FIG. 2, but with no exogenous chalcogen source. After evacuation of the tubes, the nitrogen flow is maintained at 45 ml/min. The internal diameter of each tube is 50 mm.

One sample (Sample X) is fired by a procedure according to the present invention. The cover or second crucible is in place so as to substantially retain sulphur and selenium vapors evolved from the sample in contact therewith. The other sample (Sample Y) is not treated in accordance with preferred aspects of the present invention in that there is no cover on the crucible during the firing step. Thus, it is believed that sulphur and selenium vapors evolved from this sample were substantially stripped from the sample by the flowing gas, although the relatively gentle gas flow may allow some minor quantities of these vapors to remain in contact with the sample. The firing regime includes heating from room temperature to 1000° C. in 67 minutes, maintenance at 1000° C. exposure temperature for 60 minutes followed by cooling to about 260° C. whereupon both pellets are removed from the furnace. Nitrogen flow is maintained throughout the firing regime, up to the point of removal. The laboratory atmosphere at the time of treatment is at about 20° C. and 24% relative humidity.

Sample X, treated in a semi-closed vessel which retains at least some of the evolved sulphur and selenium vapors has a stimulation quantum efficiency of 7.58%, whereas Sample Y, treated in an open container but otherwise exactly the same has a stimulation quantum efficiency of 1.85%. Sample Y, fired in an open container, has a weight loss of 36 mg (about 7%) whereas Sample X, fired in the semi-closed retainer has a weight loss of about 3.9%. Thus, the difference in potency of the two phosphors is far greater than any minor difference which might be expected from the reduction in weight loss. Both samples emit in the yellow region in stimulated emission, but the sample fired in the closed vessel is approximately four times as potent as the sample fired in the open vessel.

EXAMPLE 4

A starting material is made by blending 7 grams SrSe, 3 grams SrS, 0.9 g calcium fluoride, 0.9 g strontium sulphate, 0.004 g samarium sulphate and 0.005 g europium sulphate as activators and grinding in a ball mill for 60 minutes. A 750 mg aliquot of this mixture is processed using apparatus substantially as indicated in FIG. 3, the sample in powder form being pressed into an 18 mm long, 5 mm internal diameter tube which is capped by an alumina ball as all as illustrated in FIG. 3. A firing regime similar to that employed in Example 1 is used. At the end of the firing step, the finished phosphor is found to have shrunk away from the wall of the tube. The weight loss during firing is about 3.5%. The finished sample has spectra similar to the sample of Example 1 and stimulation quantum efficiency of 13%.

EXAMPLE 5

Example 4 is repeated using 0.0036 g bismuth sulphate ($Bi_2(So_4)_3$) instead of the samarium sulphate used in Example 4 in preparation of the base material. The resulting phosphor is generally similar to the product of Example 4, and has a stimulation quantum efficiency of 12.8%. These results indicate that the europium:bismuth activator system functions in generally the same fashion as the europium:samarium activator system.

EXAMPLE 6

The procedure of Example 2, Sample D is repeated except that different fluxes, as shown in Table 2 are employed. All of the resulting phosphors have generally similar spectra. Although there is some variation in quantum efficiencies among the various samples, reasonable quantum efficiencies are achieved with a wide variety of different fluxes.

TABLE 2

| Sample | Fluxes | Quantum Efficiency |
|---|---|---|
| A | 0.2 g $CaF_2$ | 7.9% |
| B | 0.4 g $CaF_2$ | 10.1% |
| C | 0.6 g $CaF_2$ | 10.8% |
| D | 0.8 g $CaF_2$ | 12.5% |

TABLE 2-continued

| Sample | Fluxes | Quantum Efficiency |
|---|---|---|
| E | 1 g CaF$_2$ | 11.26% |
| F | 1.2 g CaF$_2$ | 9.6% |
| G | 1.4 g CaF$_2$ | 9.3% |
| H | 0.8 g CaF$_2$ + 0.8 g SrO | 8.22% |
| I | 0.8 g CaF$_2$ + 0.8 g SrCO$_3$ | 9.32% |
| J | 0.8 g CaF$_2$ + 0.8 g MgO | 7.8% |
| K | 0.8 g CaF$_2$ + 0.6 g SrSO$_4$ | 11.0% |
| L | 0.6 g CaF$_2$ + 0.6 g SrO | 12.0% |
| M | 1.2 g SrF$_2$ | 5.85% |
| N | 1 g SrF$_2$ | 8.0% |
| O | 0.8 g MgF$_2$ | 2.27% |
| P | 0.8 g SrCl$_2$ | 4.82% |
| Q | 0.8 g NaCl | 2.22% |
| R | 0.8 g SrF$_2$ | 7.15% |
| S | 0.6 g LiF | 3.78% |

EXAMPLE 7

The procedure of Example 4 is repeated using 2 g CaS and 8 g SrSe instead of the SrSe/SrS mixture used in Example 4 in the starting material. The resulting phosphor is generally similar, but has an emission peak at about 590 nm, and stimulated emission in the yellow-orange range. The quantum efficiency is about 11.3%.

EXAMPLE 8

A starting material comprising 10 g SrSe, 0.3 g calcium fluoride flux and activator compounds including 0.005 g Eu$_2$(So$_4$)$_3$ and 0.002 g CuCl$_2$ is prepared and blended with 0.5 g sulphur as an exogenous sulphur source. Pellets of the blended material 13 mm diameter each weighing about 0.8 g are pressed under 3-4 tons pressure. The pellets thus contain both a selenide-based starting material and a sulphur exogenous chalcogen source. Each pellet is fired using apparatus generally similar to that shown in FIG. 2, but without any other chalcogen source inside the semi-closed vessel, and with the pellet supported by several alumina rods rather than an alumina ring. The firing regime includes rapid heating at about 100° C./min, followed by a 60 minute dwell at an exposure temperature of 1150° C. with subsequent cooling to room temperature, likewise at a rapid rate so that the sample is cooled in about 15 minutes. The resulting phosphor is not infrared stimulable but instead is phosphorescent. It has an absorption spectrum extending from about 540 nm to about 220 nm with peaks at 300-350 nm in the UV and 400-450 nm in the blue visible range. After exposure to exciting radiant energy within its absorption range, the material emits visible phosphorescence in the yellow region of the spectrum, with peak intensity between 560-570 nm. The light sum of the material is measured in substantially the same way as mentioned above for the infrared-stimulable materials save that the infrared stimulation step is omitted. The light sum of the phosphorescent emissions corresponds to about 10$^{18}$ photons per cubic centimeter of phosphor, and hence indicates the presence in the phosphor of about 10$^{18}$ active sites per cm$^3$.

EXAMPLE 9

The procedure of Example 4 is repeated but using the same Eu:Cu activator system as employed in Example 8. Also, the proportions of SrS to SrSe are varied. With less than about 5 weight percent SrS, the material shows very weak phosphorescence and no detectable stimutability. With about ten weight percent SrS and 90% SrSe, there is a bright green phosphorescence. As the content of SrS is increased, the phosphorescence shifts to yellow at about 30 weight percent SrS and shifts progressively to orange as the proportion of SrS further increases. Notably, this activator system provides a vivid orange phosphorescence even at 100% SrS, where no Se vapors are present in the system. This indicates that the Eu:Cu activator system is suitable for use in otherwise conventional strontium sulphide based phosphors as well as in the preferred phosphors according to other aspects of the present invention.

ADDENDUM

Recent data based upon determinations including determinations of the numbers of photons actually absorbed by phosphors confirms the comparisons between the stimulation quantum efficiency of the present IR-stimulable phosphors and prior phosphors given above. However, this data indicates that the 1% stimulation quantum efficiency attributed to the U-70 phosphor employed as a standard as noted above may be overstated.

The term "absolute stimulation quantum efficiency," as used herein, means the ratio expressed as of stimulated emission photons to stimulating IR photons absorbed, based on actual measurement of both quantities. The recent data indicates that the absolute stimulation quantum efficiency of the U-70 material, and other prior phosphors, is on the order of about 0.1%, whereas the preferred IR-stimulable phosphors of the present invention have absolute stimulation quantum efficiencies above 1%, typically about 2½% or more.

As will be readily appreciated, various modifications and combinations of the features described above can be employed without departing from the present invention. Accordingly, the foregoing description of the preferred embodiments should be taken as illustrating rather than as limiting the present invention as defined by the claims.

What is claimed is:

1. An infrared stimulable phosphor consisting essentially of:
   (a) an alkaline earth sulfur selenium crystalline matrix the alkaline-earth metal selected from the group consisting of strontium, calcium and combinations thereof, wherein the molar ratio of S to Se is between about 1:10 and 10:1;
   (b) Eu as a first activator in an amount of about 5 to about 500 ppm by weight based on the weight of the matrix; and
   (c) Bi, Sm or combinations thereof, as a second activator each in an amount of about 5 to about 500 ppm by weight based on the weight of the matrix, said activators being dispersed within said matrix, said matrix and said activators cooperatively defining active sites adapted to store energy upon exposure of the phosphor to visible or ultraviolet light, said active sites being adapted to emit said stored energy as visible light upon exposure of the phosphor to infrared light, said phosphor including at least about 5×10$^{17}$ of said active sites per cm$^3$ and having a stimulation quantum efficiency of at least 5 percent.

2. A phosphor as claimed in claim 1 including at least about 10$^{18}$ if said active sites per cm$^3$.

3. A phosphor as claimed in claim 1 further comprising a flux residue selected from the group consisting of CaF$_2$, SrF$_2$, LiF, MgF$_2$, NaCl, SrSOP$_4$, SrCl$_2$, SrO, SrCO$_3$ and combinations thereof.

4. A phosphor as claimed in claim 3 wherein said flux residue is present in said phosphor in an amount corresponding to between about 6% and about 18% by weight of said matrix.

5. A phosphor as claimed in claim 1 in which said second activator is Sm.

6. A phosphor as claimed in claim 1 in which said alkaline-earth metal consists essentially of Sr.

7. A phosphor as claimed in claim 1 having an absorption peak in the ultravoilet at between about 300 and about 350 nm, a further absorption peak in the visible range at between 400 and 450 nm, an emission peak between 555 and about 590 nm, and a stimulation peak between about 950 and about 1050 nm.

8. A phosphor as claimed in claim 7 wherein said stimulation quantum efficiency is at least about 10%.

9. A phosphor as claimed in claim 1 having a stimulation quantum efficiency of at least about 10%.

10. A method of making an infrared-stimulable phosphor as defined in claim 1 comprising the steps of:
 (a) firing a mass of starting material comprising one or more fluxes selected from the group consisting of $CaF_2$, $SrF_2$, LiF, $MgF_2$, NaCl, $SrSO_4$, $SrCl_2$, SrO, $SrSO_3$ and combinations thereof, said first and second activators, and a matrix-forming material comprising one or more alkaline-earth metals selected from the group consisting of Ca and Sr and one or more chalcogens selected from the group consisting of S and Se at an elevated exposure temperature sufficient to cause recrystallization of said matrix-forming material into a crystalline matrix consisting essentially of said alkaline-earth metals and said chalcogens, and disperse said activators in said matrix;
 (b) exposing said mass during said firing step at said exposure temperature to a treating atmosphere comprising S vapor and Se vapor by keeping the reaction mass in a closed or semi-closed vessel during firing wherein the ratio of internal volume to starting material volume is about 10:1 or less, said exposure temperature being sufficient to cause release of S, Se or both from said mass and replacement thereof by said vapors; and then
 (c) cooling said matrix.

11. A method as claimed in claim 10 wherein said matrix-forming material consists essentially of one or more compounds selected from the group consisting of CaS, CaSe, SrS, and SrSe.

12. A method as claimed in claim 11 wherein said exposing step includes the step of providing a source of sulphur and/or selenium vapors other than said matrix-forming material and contacting vapors derived from said source with said matrix.

13. A method as claimed in claim 12 wherein said matrix-forming material consists essentially of calcium selenide and/or strontium selenide and said source is a source of sulphur.

14. A method as claimed in claim 13 wherein said source consists essentially of pure sulphur.

15. A method as claimed in claim 11 wherein said vapors in said treating atmosphere include at least one vapor derived from S and/or Se released from said mass, said exposing step including the step of retaining vapors released from said matrix in contact with said matrix.

16. A method as claimed in claim 15 wherein said matrix-forming material includes both sulfur and selenium.

17. A method as claimed in claim 16 wherein said vapors consist essentially of sulphur and selenium released from said mass.

18. A method as claimed in claim 15 wherein said vessel has a retention ratio of at least about 2 and the ratio of the interior volume of said vessel to the weight of said matrix-forming material is about 10 $cm^3$/g or less.

19. A method as claimed in claim 10 wherein said exposure temperature is between about 950° C. and about 1200° C.

20. A method as claimed in claim 19 wherein said exposure temperature is maintained for at least about 20 minutes during said firing step.

21. A method as claimed in claim 10 wherein one of said one or more fluxes is $CaF_2$, and wherein said one or more fluxes are present in said starting material in an amount equal to between about 1% and about 25% by weight based upon the weight of said matrix-forming material.

22. An infrared-stimuable phosphor made by a method as claimed in claim 10.

* * * * *

UNITED STATES PATENT AND TRADEMARK OFFICE
CERTIFICATE OF CORRECTION

PATENT NO. : 4,857,228

DATED : August 15, 1989

INVENTOR(S) : Kabay et al.

It is certified that error appears in the above-identified patent and that said Letters Patent is hereby corrected as shown below:

Col. 5, line 16, "55" should read --555--. Col. 8, line 60, after "declines" there should be inserted --.--. Col. 19, line 43, after "any" there should be inserted --sulphur--. Claim 2, line 2, "if" should read --of--. Claim 3, line 3, "SrSOP$_4$" should read --SrSO$_4$--; line 4, "SrCO$_3$" should read --SrSO$_3$--.

Signed and Sealed this

Sixteenth Day of October, 1990

Attest:

HARRY F. MANBECK, JR.

*Attesting Officer*　　　*Commissioner of Patents and Trademarks*